G. H. JOHNSON.
Grain Bin.
No. 87,568.
Patented March 9, 1869.
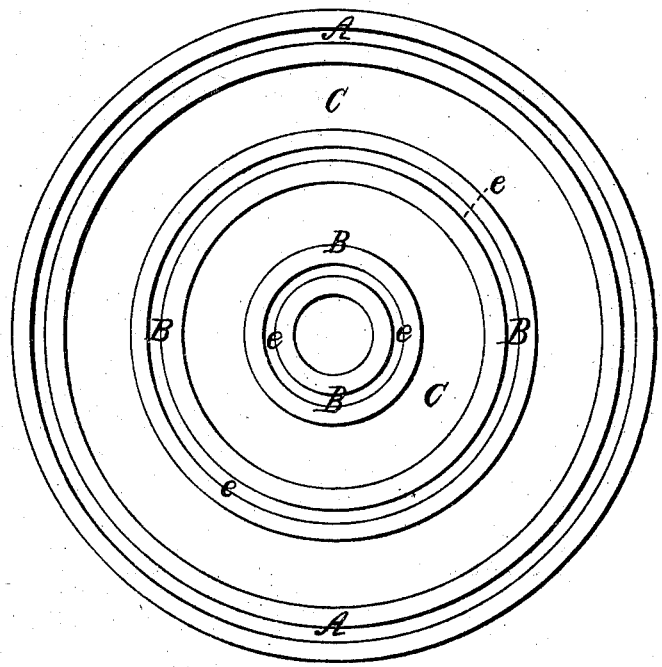
Witnesses:
W. V. Burris.
A. H. Rowe.
Inventor:
Geo. N. Johnson
By Dana A. Burr atty.

GEORGE H. JOHNSON, OF BUFFALO, NEW YORK.

Letters Patent No. 87,568, dated March 9, 1869.

IMPROVEMENT IN FIRE-PROOF GRAIN-BINS.

The Schedule referred to in these Letters Patent and making part of the same.

*To all whom it may concern:*

Be it known that I, GEORGE H. JOHNSON, of Buffalo, in the county of Erie, and State of New York, have invented a new and useful Improvement in the Interior Arrangement and Construction of Cylindrical Grain-Bins; and I do hereby declare the following to be a full, clear, and exact description thereof, reference being had to the accompanying drawing, forming a part of this specification, and which represents a plan view of my improved cylindrical bin, with all upper parts and covering thereto removed.

The nature of my invention relates to a novel arrangement of the interior of a fire-proof cylindrical structure, wherein to dry and renovate as well as to store grain in bulk; and It consists in the partition of the inner space of such cylindrical bin or granary into vertical, annular, concentric compartments, wherein to receive and store the grain, by means of a series of concentric hollow walls, built of bricks or blocks, formed of porous, unburnt clay, or unglazed earthenware, or other absorbent material, either porous by nature, or artificially made porous, by means of minute perforations therein, whereby the grain in store may be readily dried through the absorption of moisture therefrom by said hollow, porous walls.

The best and most approved fire-proof granaries now constructed, consist of a series of cylindrical bins, of masonry or brick-work, placed together in a group of any suitable number of individuals.

The object of my invention is to make such granaries useful in drying and renovating the grain stored therein, without materially lessening their capacity, and to avoid the use of independent drying-machines, saving thereby the cost of the construction and operation of such machines, and the expense of handling and conveying grain to and from the same.

I accomplish my object by erecting, within each of the grain-bins A, a series of concentric hollow walls, B B, dividing the same into a series of annular compartments, C C, wherein I place the grain to be stored.

The number of the compartments C, thus formed in each bin, may be greater or less, according to the diameter of the bin, and the requirements of the trade.

Where much wet grain is to be stored, the number of the compartments should be increased, and their width diminished, to expedite the drying of the grain.

The hollow walls B B may be built of a single course of hollow bricks, of unburnt clay, made (as described in the patent granted to Messrs. Johnson and Milsom, on the 2d of February, 1869,) segmental in form, to correspond with the arc of the circle upon which they are to be laid up, or they may be built of porous bricks, or blocks of other descriptions, laid up so as to make a narrow wall, having an inner hollow space, $e$, extending up through the same.

The hollow spaces $e\ e$, within these concentric partition-walls B B, are all connected at the bottom with flues, communicating with a suitable furnace, so that hot air may be admitted therein to heat the walls, and create an upward draught through the same.

The upper ends of the spaces $e\ e$ are also made to communicate with a suitable discharging-flue, or chimney, to complete the current of air through the same.

The annular compartments C C are so arranged as to be readily filled with grain from above, by means of suitable conveyers and spouts, and are provided with chutes and spouts, in the bottom thereof, whereby the grain may be readily discharged therefrom.

When any or all of the bins, thus divided into concentric compartments, are filled with damp or wet grain, currents of hot air may be passed through the hollow spaces in the inner partition-walls, thus heating the grain stored in the interior compartments. The moisture from the grain will, at the same time, be absorbed by the porous walls, their absorbent action being quickened by the outward draught created in the pores thereof, by the passage of the hot current within them, and thus the moisture of the grain will be drawn off and carried away to the chimneys of the structure.

I do not now claim the process of drying grain in bulk, as herein described, as that has been made the subject of a separate application for Letters Patent; but, having fully described my improvement in the construction of fire-proof bins for storing, drying, and preserving grain,

I claim therein as new, and desire to secure by Letters Patent—

The combination of a series of concentric, hollow partition-walls, of any suitable porous materials, with the interior of a cylindrical or polygonal grain-bin, substantially as and for the purpose herein set forth.

The foregoing specification of my improvement in the construction and arrangement of fire-proof bins, for storing and drying grain, signed by me, this 14th day of January, 1869.

GEO. H. JOHNSON.

Witnesses:
DAVID A. BURR,
H. M. GAYLORD.